(12) United States Patent
Wang

(10) Patent No.: US 8,452,988 B2
(45) Date of Patent: May 28, 2013

(54) SECURE DATA STORAGE FOR PROTECTING DIGITAL CONTENT

(76) Inventor: Michael Sujue Wang, Bethlehem, PA (US)

( * ) Notice: Subject to any disclaimer, the term of this patent is extended or adjusted under 35 U.S.C. 154(b) by 947 days.

(21) Appl. No.: 11/782,108

(22) Filed: Jul. 24, 2007

(65) Prior Publication Data

US 2008/0022134 A1    Jan. 24, 2008

Related U.S. Application Data

(60) Provisional application No. 60/832,858, filed on Jul. 24, 2006.

(51) Int. Cl.
G06F 11/30    (2006.01)

(52) U.S. Cl.
USPC ............... 713/193; 380/44; 380/46; 380/277; 380/281

(58) Field of Classification Search
USPC ................ 713/193; 380/44, 46, 277, 281
See application file for complete search history.

(56) References Cited

U.S. PATENT DOCUMENTS

| | | | |
|---|---|---|---|
| 5,513,260 A | 4/1996 | Ryan | |
| 6,112,181 A | 8/2000 | Shear et al. | |
| 6,157,721 A | 12/2000 | Shear et al. | |
| 6,226,618 B1 | 5/2001 | Downs et al. | |
| 6,398,245 B1 | 6/2002 | Gruse et al. | |
| 6,480,961 B2 | 11/2002 | Rajasekharan et al. | |
| 6,574,609 B1 | 6/2003 | Downs et al. | |
| 6,591,367 B1 | 7/2003 | Kobata et al. | |
| 6,636,966 B1 | 10/2003 | Lee et al. | |
| 6,697,944 B1 | 2/2004 | Jones et al. | |
| 6,697,948 B1 | 2/2004 | Rabin et al. | |
| 6,711,553 B1 | 3/2004 | Deng et al. | |
| 6,865,550 B1 | 3/2005 | Cok | |
| 6,898,706 B1 | 5/2005 | Venkatesan et al. | |
| 6,937,726 B1 | 8/2005 | Wang | |
| 6,954,860 B1 | 10/2005 | Thatcher et al. | |
| 6,983,371 B1 | 1/2006 | Hurtado et al. | |
| 6,999,588 B1 * | 2/2006 | Oishi ........................... 380/246 | |
| 7,065,216 B1 | 6/2006 | Benaloh et al. | |
| 7,069,246 B2 | 6/2006 | Stebbings | |
| 7,079,649 B1 | 7/2006 | Bramhill et al. | |
| 7,111,169 B2 | 9/2006 | Ripley et al. | |
| 7,130,426 B1 | 10/2006 | Cha et al. | |
| 7,165,050 B2 | 1/2007 | Marking | |
| 7,174,568 B2 | 2/2007 | Chatani et al. | |
| 7,818,587 B2 * | 10/2010 | Drew et al. .................... 713/193 | |
| 7,849,510 B2 * | 12/2010 | Danilak .......................... 726/26 | |
| 7,889,863 B2 * | 2/2011 | Harada et al. ................. 380/201 | |
| 2005/0251866 A1 * | 11/2005 | Kobayashi et al. ............. 726/27 | |
| 2006/0190426 A1 * | 8/2006 | Kanazawa et al. ................ 707/2 | |

* cited by examiner

*Primary Examiner* — Amare F Tabor
(74) *Attorney, Agent, or Firm* — Fox Rothschild LLP; Richard C. Woodbridge; Ryan Miller

(57) ABSTRACT

A non-copyable data storage disk (NCDisk) that may be used in a secure data storage system. Stored data items on the NCDisk may only be used through the data storage system, and cannot be copied to and used by any other devices. Digital data written to the NCDisk is automatically converted to a new format by the NCDisk itself before being stored on it. Similarly, when reading a data item out from the NCDisk, the NCDisk itself automatically converts the stored data item to a new data format that a reading device can recognize. Data conversion does not involve the computer operating system. The data conversion unit may include a chipset level 2 secure key management module that generates and manages the keys used for the data conversion.

20 Claims, 11 Drawing Sheets

SECURE DATA STORAGE FOR PROTECTING DIGITAL CONTENT

CROSS REFERENCE TO RELATED APPLICATIONS

This application claims the priority of U.S. Provisional Application Ser. No. 60/832,858 entitled "Method and Apparatus for Online Downloading Digital Items" filed on Jul. 24, 2006, the entire contents and substance of which are hereby incorporated in total by reference.

FIELD OF THE INVENTION

The present invention relates to systems and methods for securely storing, transporting, and using data contents, and more particularly to systems and methods for a copy proof storage disk.

BACKGROUND OF THE INVENTION

A popular copy-protection method, commonly used when storing data on a disk, is to use computer software to encrypt the data. The encrypted data is then saved on the disk, while the encryption keys are saved either on the computer or on a server. The encryption keys may also kept by the user or stored in the same location as the encryption software Examples of such systems may be found, for instance in U.S. Pat. Nos. 6,937,726, 6,954,860, 6,697,948, 7,069,246, 7,174, 568, 6,591,367, 6,398,245, 6,983,371, 6,480,961, 6,865,550, 7,165,050, and 7,079,649.

One of the major industry approaches for data content protection is Digital Right Management (DRM). This is an umbrella term referring to technologies used by publishers or copyright holders to try to control access to or usage of digital data or hardware, as well as to restrictions associated with specific instances of digital works or devices, DRM is mainly focused on the copy-protection of data distributed over the internet and downloaded onto computers and/or portable devices. Content providers typically use servers to encrypt data. The encryption key is typically stored on the server or on a third-party clearing house. When users buy data content from the server, the encrypted data may then be downloaded from the server to the user's device. Then, the user's device obtains the license from the server or clearing house to activate the data. The license is bounded to the user's device that stores the data. If the data is copied to another device, that device needs to obtain its own binding license to play the data. Examples of such systems may be found in, for instance, U.S. Pat. Nos. 6,157,721, 6,112,181, 6,574,609, 7,065,216, 6,711, 553, 5,513,260, 7,111,169, 6,898,706, 6,226,618, 6,636,966, 7,130,426 and 6,697,944. DRM systems typically rely on the storage device, player device, computer, and license server to work together to ensure the copy-protection function. If any of these components have security weaknesses, then the whole system becomes vulnerable.

Another industry approach for data content protection is the Trusted Platform Module (TPM) proposed by Trusted Computing group of Beaverton, Oreg. The TPM is a low-cost chipset module that consists of a processor, a memory, and an encryption and hash engine. The TPM functions as a slave processor for the host computer to keep secrets and perform security functions. The computer operating system and computer software controls the TPM operations. The critical root of trusted software is saved on a bootup ROM, which is the only entry point code to manage the TPM module.

Despite these, and many related, approaches to content protection, the piracy of copyrighted digital content, such as music, movies, books, etc, remains a significant problem. A major part of the problem is that once pirated, digital material may be repeatedly copied with no lose of quality and then proliferated throughout the Internet with ease.

To better examine the root cause of the digital content piracy problem, consider the current types of storage devices and their security problems. There are currently three major types of digital content storage devices: (1) flash drives or hard disks, (2) DVD or CD disks, and (3) standalone hardware storage devices that are not connectable to a PC, such as set-top boxes for cable TV.

Flash drives or hard disks typically store digital content written in or read out by a computer. The flash drive or hard disk itself does not have control over the security level of the digital data that it stores. Instead, this control is left to the computer that is connected to the storage device. In order to protect a digital data from been copied, the data must be encrypted by critical secrets, or keys, which must be hidden from all those who are not suppose to copy the digital data. Also, the software that the computer runs for protecting the digital data must be protected so that attackers cannot maliciously alter the software or obtain useful information through reverse-engineering the software. Currently, there are two major methods for implementing copy-protection of digital data in flash drives or hard disks.

One type of method is through purely computer software approaches. Such approaches are mainly used in general purpose computers so as to avoid making hardware changes to the computer. In this case, computer software is used to control encrypting the digital data, storing it into the flash or hard drive, and hiding the keys. However, there are problems with just using software to hide the keys on a general purpose computer. First, a general purpose computer does not have secure locations to store secret information. Such secure locations are needed because although encrypted data cannot be read by pirates, there will always be some critical secret that must remain in unencrypted form to be used by the software, and these secrets must be securely stored on the computer. Second, it is not secure to hide the keys within the software. A dedicated attacker would be able to reverse-engineer the software to figure out the secrets. In addition, the key could also be stored on a third-party system that is physically separated from the computer. However, such a system still demands some identification information that must be kept secret. This purely software method on a general purpose computer will not be able to protect the secrets.

Another type of method for implementing copy-protection of digital data in flash drives or hard disks is through adding security-based hardware modules to the computer system. Such hardware modules are designed to perform various security tasks such as securely storing critical secrets, acting as hardware-based cryptographic engines, protecting the integrity and/or privacy of security software that is run on the computer, and more. However, in all such cases, the computer operating system and software still has the master control over the security of the data content stored on the connected flash or hard disk. The computer OS and software control the access of the hardware module to manage the secret keys and perform data encryption for a file stored on the hard disk. An example of such a hardware-assisted security system is the Trusted Platform Module (TPM), which is an industry standard proposed by Trust Computing Group of Beaverton, Oreg. TPM is a chipset that contains memory, an encryption engine, and a hash engine. The TPM chipset stores secret keys that attackers are not supposed to access. Only measured operating system and measured computer software can access the TPM module. The critical root of trust software that performs the measuring of the computer operating system and software is stored on a boot-up ROM. The ROM is outside of TPM chipset and located on the computer's mother board because the ROM is application dependent instead of TPM dependent. This system has improved security since TPM is only accessible by measured operating system and measured software. However, this system still has some problems as described below.

A first problem is the weakness in the interfacing between the computer and the secure hardware module. This problem is a result of the computer still having control over the secure hardware module. The computer is an open system that makes it easy for attackers to understand and then simulate what the secure software does in order to access the critical secrets stored in the secure hardware module.

A second problem is the computer software security. The software controls access to the secure hardware module. Breaking the software may also break the secure hardware module. As operating system and other software become more and more complicated, their many requirements and performance goals began to contradict each other. Further, it is becoming more and more difficult to keep the software bug-free due to its increasing size and complexity. An example is the case of Microsoft's new operation system Vista, which showed security weakness after only several months after it is released to market. Hence, although the operating system and software could be improved, it is difficult to make them completely free of bugs and other security weaknesses.

A third problem is a hardware attack. The movie pirate may, for instance, be a person who can physically open up the computer to attack the secure hardware module. They may be able to open the secure hardware module and probe the internal bus, and then perform reverse-engineering on the module. For example, in the TPM system, an attacker may not even need to open up the TPM chipset. Instead, they only need to replace the boot-up ROM with a new Rom that contains a code that will bypass all the software security checks. Therefore, there are still a lot of security problems for a secure hardware module assisted computer. To better distinguish the security performances of various hardware modules, we define two security levels:

Chipset Level-1 Security Definition: a particular on-chip component has Chipset Level-1 Security if an attacker has to physically open up the chipset and probe the bus to obtain data from the component by either running software on the internal processor or external processor.

Chipset Level-2 Security Definition: a particular on-chip component has Chipset Level-2 Security if an attacker may not obtain data from the component even if they physically open up a chip, probe the bus, and run software on the internal processor or external processor. A possible way to obtain data from the component is to perform gate level reverse-engineering of the chipset.

Existing secure hardware-assisted computer systems and movie/music data security systems typically only have Chipset Level-1 security performance. The present invention is, in contrast, a Chipset Level-2 security system for protecting content that typically requires extremely high cost equipment that is typically not affordable to the individuals and small companies that typically pirate content.

Another method of storing, transporting, and playing digital contents is the DVD system. The DVD encryption system, however, has been compromised for some time, making DVD disks relatively easy to copy. The DVD system should, therefore, be considered as a convenient, portable, media player system, not as a copy-protected system.

The stand along hardware such as cable box provides some measure of copy-protection. Its security level, however, is typically only level-1 security. Some cable box systems, for instance, distribute their security measures over many hardware components, rather than having them inside one secure chipset, allowing an pirate multiple points of attack. In some cable box systems, secrets are stored on a smart card that is relatively easy for an experienced attacker to break and clone. One positive aspect of cable box security is that they do not typically interface directly to a PC or network, so they are typically less amenable to attack by the casual content pirate.

Modern digital, communication technology make the internet a powerful tool for bringing a myriad of media content directly to homes. However, the piracy of the digital contents is still a major barrier that discourages content providers from putting their contents online since pirating a single, digital copy of a movie may result in thousands of high quality copies being distributed over the Internet. Hence, potentially desirable services, such as interactive TV and home movie theaters that network directly to Hollywood movie databases, have not been implemented. To solve this piracy problem, a highly secured copy-protection system that overcomes the shortcomings of the prior-art systems, is needed. This secure copy-protection system should have the following features. First, the copy-protection performance should not be affected by weaknesses and bugs of computer operating system and computer software. Further, the copy-protection for a stored data should not rely on humans to keep secrets since even an legitimate user may make illegal copies of media contents. Moreover, this secure copy-protection system should have chipset level-2 security performance so that even if an adversary opens the hardware chipset and probes its internal bus, the adversary still cannot obtain the critical secrets.

SUMMARY OF THE INVENTION

The present invention provides a system and method for a secure data system that overcomes many of the problems in the prior art and achieves the goals described above.

In typical prior art copy-protection methods, the security of the copy-protection is achieved by a system that typically includes a data storage device, a host device such as a computer, a data player, or a data recorder, and a server that is typically used to hide secrets. In these systems, the data storage device is typically a simple device used for writing, storing, and reading data. The host device controls the security process for the data storage device. However, the host device is vulnerable to attack, since it is typically complicated, and typically includes many parts designed and manufactured by different entities.

In contrast, the security of the present invention does not rely on the integrity of the host device. In the methods and system of the present invention, a data storage device may take care of all security process without the need of a host device or a server. In the present invention, the security performance may be based on a single device that may be made by a single manufacturer making security easier to achieve.

In a first preferred embodiment, the present invention includes a method and an apparatus for a non-copyable data storage system. In such a data storage system, data items stored on the data storage system can only be used through this data storage system, and cannot be copied to and used by any other devices. For ease of understanding, this invention is presented, by example, as a computer hard disk. Hence a non-copyable disk (NCDisk) represents an example of the non-copyable data storage system.

In a preferred embodiment of the NCDisk, digital data written to the disk is automatically converted into a new format by the NCDisk itself. The converted data items may then be stored on the NCDisk. Similarly, when reading a data item out from the NCDisk, the NCDisk itself automatically converts the stored data item to a new data format that a reading device can recognize. This data conversion occurs in its entirety within the NCDisk. Only the NCDisk, therefore, needs to know the conversion format and the converting secrets. Furthermore, no human needs to know the conversion secrets. During the entire NCDisk data conversion process, the computer operating system and computer software is not involved. In addition, the NCDisk may have an access authentication feature. This authentication may only give a user permission to perform functional operations, such as writing, reading, deleting, or overwriting data items on to the disk. It does not give user any information about how the NCDisk converts a data item. Inside the NCDisk, there may be a system-on-chip (SoC) chipset called the data conversion unit that performs all data conversion operations. Inside the data conversion unit, there may be a key management module that generates and manages the secret keys for the data conversion. No human needs to know the key values used for the different data items. The algorithm of the key management may ensure that every derived key is cryptographically secure. Different digital data may, for instance, use different keys and each key may only be used for once, or at a very long repeat interval. The architecture of the key management module may ensures that the key management module has a chipset level-2 security, which means even if an adversary opens the chipset and probes the internal bus, the secrets of the NCDisk are still secure.

In a further preferred embodiment, the NCDisk is incorporated into a communication network to provide a system and method for protecting data content being stored, transported or played over a communication network. For ease of understanding, this embodiment of the invention is exemplified as a movie online download system. Such an exemplary movie online download system may be used for internet interactive TV or for internet movie buying/renting service applications. The movie download system may, for instance, consist of a server, a client, and a player device. The client may, for instance, incorporate the NCDisk. In such an embodiment, when the client downloads a movie from the server to the NCDisk, the NCDisk may internally convert the movie to a new format that is only recognizable by the NCDisk. Hence the downloaded movie may only be played through the NCDisk, and cannot be copied to other devices. The output signal of the NCDisk may, for instance, be a copy-protected analog signal that is directly sent to TV.

In yet a further embodiment of the invention, the NCDisk may be incorporated into an application system that utilizes a data storage device. In such an embodiment, the present invention may be a system and method that protects data content for the application system. When using the NCDisk as data storage device for an application system, a data item stored on the NCDisk may be converted to a new data format that only the NCDisk may recognize. Hence, the stored data is non-copyable. When a user issues a request to read, delete, or overwrite the stored data item, the user may need to request access permission from the NCDisk. Each file in the NCDisk may be associated with one or more of three types of authentications based on the user's security goal for the data item. These types of authentications may be, but are not limited to on of the following three. An authentication that automatically issues permission to a pre-configured device by which user has pre-registered the related devices onto the NCDisk, and the NCDisk will issue the permission when the registered device is detected. This authentication type is convenient for users since no human action is needed for the authentication. The user may remotely access the NCDisk through another device by inputting a password if the user is registered as a legitimate user of the NCDisk. A Human-NCDisk interaction verification in which the user has to physically interact with the NCDisk by, for instance, pushing a button, typing from a built-in keypad, sending a voice command or taking some other action. This type of authentication may prevent software attacks on the NCDisk.

The present invention of an NCDisk equipped application system may, for instance, be exemplified by a computer system that uses NCDisk as hard disk, a media player device that acts like a diskless DVD player, which can be used to store and play movie on a TV, and a mobile phone that has a NCDisk inside that controls data security for a regular PC by a wireless connection between the PC and the mobile phone.

These and other features of the invention will be more fully understood by references to the following drawings.

DETAILED DESCRIPTION

Embodiments of the invention described below are illustrated by way of example, and not by way of limitation. For instance, in the following drawings and descriptions, we use "disk" as a concrete example of the invention, but the invention may refer to any data storage system. Also, we use "movie" download as a concrete example of the invention, but the invention may actually refers to the download process of any digital items including movies, digital pictures, music, games, digital books, audio recorders, documents, software etc. Moreover, in the following drawings and descriptions, we use "encryption" as a concrete example, but the invention may actually refer to any kind of file format change including encoding and decoding, compression and depression, scramming and de-scramming, modulating and demodulating, data conversion and de-conversion, data mapping and de-mapping, and etc. In this case, the key represent the format type and parameters.

A preferred embodiment of the invention will now be described in detail by reference to the accompanying drawings in which, as far as possible, like elements are designated by like numbers.

Although every reasonable attempt is made in the accompanying drawings to represent the various elements of the embodiments in relative scale, it is not always possible to do so with the limitations of two-dimensional paper. Accordingly, in order to properly represent the relationships of various features among each other in the depicted embodiments and to properly demonstrate the invention in a reasonably simplified fashion, it is necessary at times to deviate from absolute scale in the attached drawings. However, one of ordinary skill in the art would fully appreciate and acknowledge any such scale deviations as not limiting the enablement of the disclosed embodiments.

Figure 1A:
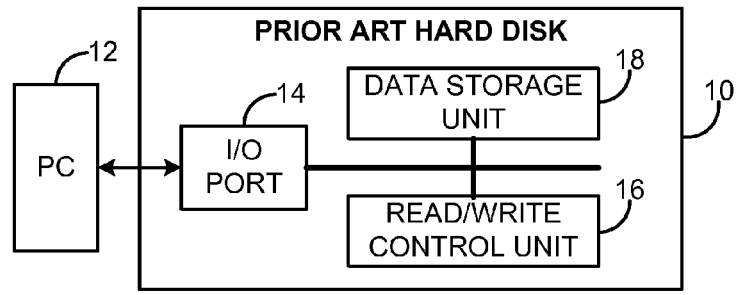
FIG. 1A shows a schematic layout of a high-level hardware architectures for the prior art hard disk.

The present invention is a novel data storage system that improves upon the existing prior art hard disk. FIG. 1a shows the high-level hardware architecture of a prior art hard disk. The prior art hard disk 10 can be connected to a PC 12 via an input/output port 14. A read/write control unit 16 manages the reading and writing of data to and from a PC 12. Data is stored on a data storage unit 18. The security levels of the data stored in the data storage unit 18 are controlled by the PC 12.

Figure 1B:
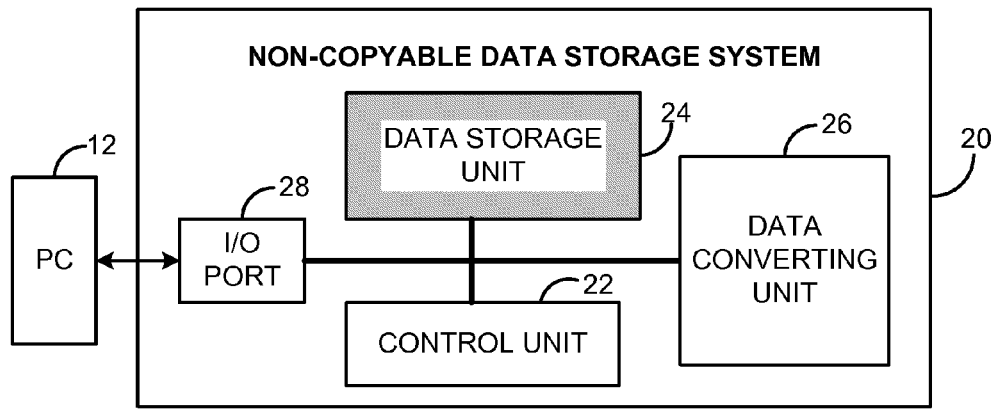
FIG. 1B shows a schematic layout of a high-level hardware architectures of the non-copy-able data storage system of the present invention.

FIG. 1b shows a high-level hardware architecture of a non-copy-able data storage system of the present invention. Similar to the prior art hard disk 10, the non-copy-able data storage system 20 may be connected to a PC 12 via an input/output port 28. A control unit 22 manages the reading and writing of data to and from the PC 12, and also manages security level of the data stored on a data storage unit 24. More specifically, the control unit 22 instructs a data converting unit 26 to perform the necessary security processing on the data stored on the data storage unit 24. Hence, unlike the prior art hard disk 10, the security levels of the data stored on the non-copy-able data storage system 20 are not controlled by an outside processor but by the control unit 22 and the data converting unit 26.

Figure 1C:
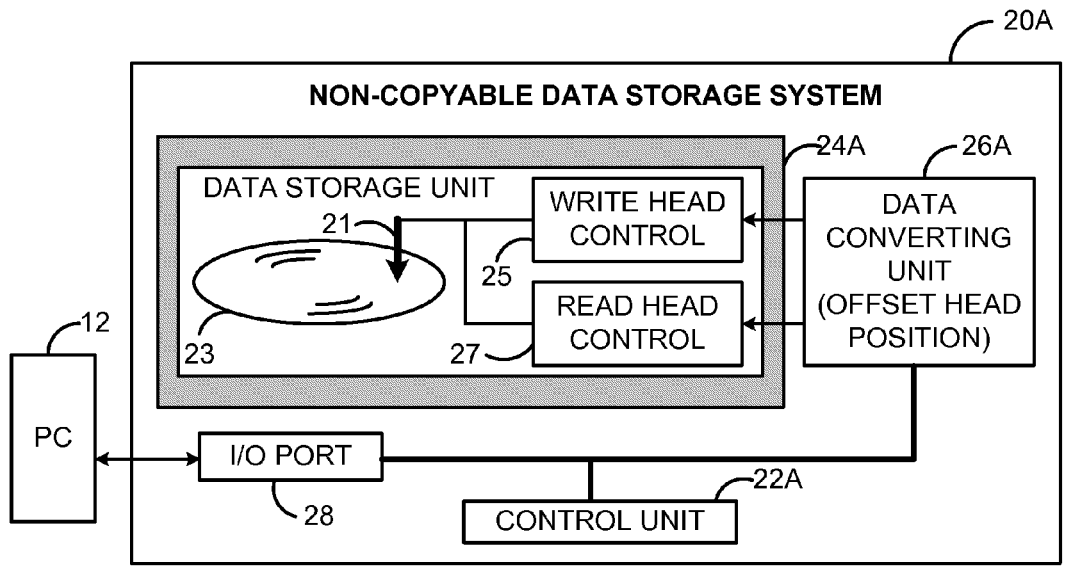
FIG. 1C shows a schematic layout of a preferred mechanical hardware architecture of the non-copy-able data storage system of the present invention.

FIG. 1c presents a second preferred embodiment of the current invention for the NCDisk 20. NCDisk 20A is a special implementation of NCDisk 20 that is based on the hard disk. The NCDisk 20A has a data storage unit 24A that consists of a spin-disk 23, a writing probe-head controller 25, and a reading probe-head controller 27. When PC 12 writes a data into the NCDisk 20A through the I/O port 28, the control unit 22A receives the writing address and the input data. The data converting unit 26A sends the address and data to writing head controller 25 such that the probe-head 21 is positioned on the spin-disk 23 that matches the input address. And the data is written on the address. When PC 20 reads the data from the NCDisk, the control unit 22A receives its address. The data converting unit will put a random offset on the address before sending the converted address to the reading head control 27. The converted address causes the computer to readout the wrong data. Hence, the data content is protected. The computer will receive the correct data only if it passes the NCDisk hardware authentication, in which case the data converting unit 26A will compensate the address offset and correct the data that is read out.

Figure 2:
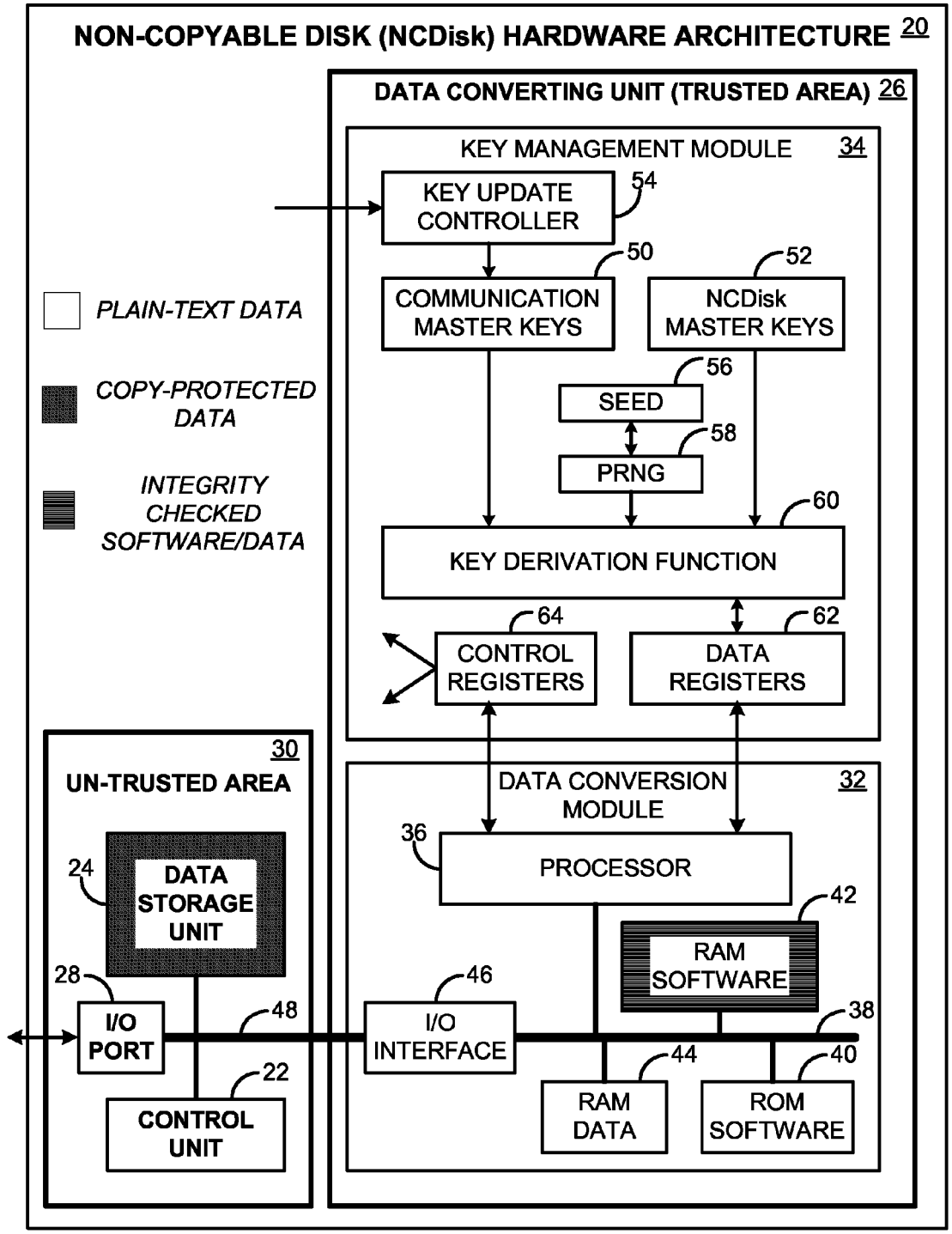
FIG. 2 shows a schematic layout of a preferred detailed hardware architecture of the non-copy-able data storage system of the present invention.

FIG. 2 shows a preferred, detailed hardware architecture of the non-copy-able data storage system of the present invention, termed a non-copyable disk (NCDisk) 20. The NCDisk 20 has an un-trusted area 30, which does not contain any critical secrets of the NCDisk 20 and does not perform any secure processing. The un-trusted area 30 comprises an input/output port 28, a control unit 22, and a data storage unit 24. The input/output port 28 connects the un-trusted area 30 to another device, such as a PC 12. The control unit 22 manages the reading and writing of data to and from another device, such as a PC 12, and also manages the security level of the data stored on the data storage unit 24. More specifically, the control unit 22 instructs the data converting unit 26 to perform the necessary security processing on the data stored on the data storage unit 24. Further more, unlike a prior-art hard disk, the NCDisk has an authentication protocol for controlling access to the NCDisk. The control unit 22 may manage the authentication protocol. The I/O port 28 may include a human-NCDisk interface that may, for instance, allow a user to push a button, to strike a keypad, or to issue a voice command or perform some other physical function.

The data converting unit 26 of the NCDisk 20 is a trusted chipset that comprises a data conversion module 32 and a key management module 34. The data conversion module 32 comprises a processor 36 that is connected via a bus 38 to a Read Only Memory (ROM) software module 40, a Random Access Memory (RAM) software module 42, and a RAM data module 44. The bus 38 may be internal to the data converting unit 26 and physically separated from the bus 48 in the un-trusted area 30 by the input/output interface 46. The bus 38 conveys secure information that should not be leaked out to the un-trusted area 30. The processor 36 may only be able to execute software stored on the ROM software module 40 and the RAM software module 42. More specifically, the ROM software module 40 may be the starting point of all software run on the processor 36. All processors typically require a Basic Input/Output System (BIOS) to boot-up, and that BIOS is the starting point of execution for the processor. In this case, software on the ROM 40 behaves as the BIOS for processor 36. The software stored on ROM 40 cannot be changed due to the read-only property of ROM. After booting up the processor 36, the BIOS software on the ROM software 40 may then call other software on the ROM software module 40 or on the RAM software module 42 to run on the processor 36. The RAM software module 42 is integrity checked by the ROM software module 40 using, for instance, the critical secrets of a communication master key 50 or an NCDisk master key 52 before being executed. Hence, the RAM software cannot be changed by an attacker. Furthermore, some secret data and run-time data from the execution of the processor 36 are stored in RAM data 44. The input/output interface 46 prevents the RAM data 44 from leaking to the un-trusted area 30.

In some simple applications, the data conversion module 32 may only need to perform a limited set of data conversion functions, and so may not require a processor-based module, as shown in the block 32. Instead, the data conversion module 32 may be completely implemented by ASIC circuits. The downside of such an approach is that the set of functions will be fixed by the ASIC circuits, while the processor-based module may provide more flexibility as different functions may be programmed in software.

In some embodiments, the system on chip (SoC) may include both control unit 22 and data conversion unit 32 in order to put the control unit 22 in trusted area and allow the control unit to share the resources of processor 36. In such cases, the control unit 22 may be moved into data conversion module 32 and connected to internal bus 38. The I/O interface 46 may also be combined to I/O port 28. Together they may keep the internal bus 38 secure from devices outside the NCDisk.

The key management module 34 stores the critical secrets for the NDisk 20 in the form of the communication master keys 50 and NCDisk master keys 52. The communication master keys 50 are known by both the NCDisk and another party that needs to communicate with the NCDisk. The communication master keys 50 may be changed and updated by an authenticated party. The authentication and updating of the communication master keys 50 are controlled by the key update controller 54. There may be a number of methods to implement the key update controller 54. One exemplary method of implementing the update controller is:

(1) The communication master keys 50 may only be updated by a legitimate party, who knows the old key values.

(2) The legitimate party first inputs the old communication master key values.

(3) The legitimate party then inputs the new communication master key values.

(4) The Key Update Controller 54 uses hardware logic circuits to compare the inputted old communication master key values with the existing communication master key values 50.

(5) If the two sets of key values are the same, then the legitimate party is authenticated.

This is because only the legitimate party could have known the old communication master key values. Then, the existing keys values are replaced with the new inputted key values.

(6) If the two sets of key values are not the same, then the Key Update Controller 54 runs a hardware delay before resetting the controller. This is to ensure that an attacker may not feasibly devise an automated way to keep guessing the old key value by brute force.

Further, the NCDisk master keys 52 are known only to the NCDisk. These master keys 52 are never changed, and hence there are no write ports for these keys. It is important to note that the communication master keys 50 and the NCDisk master keys 52 are never directly used by processor 36 to perform security processing. Instead, processor 36 instructs the key management module 34 through control register 64. The processor 36 loads a certain value onto the control register 64, where different values represent different operations to be performed by the key management module 34. More specifically, processor 36 instructs a pseudo-random number generator (PRNG) 58 to generate a pseudo-random number, using a seed 56. The random number is then sent along with the one of the master keys into the key derivation function 60. The control register 64 determines which master key to use. The key derivation function 60 outputs a derived key value and stores it in register 62. The processor 36 uses this derived key value for the security processing. Each time that a new derived key value is needed, the PRNG 58 generates a new pseudo-random number and inputs it to the key derivation function 60. When data is written to the disk, an encrypted copy of the derived key is stored with the encrypted data, as well as a key identification number that was used along with the master key to generate the derived key. If the encryption algorithm is a symmetric key encryption key, when the data is read, the derived key can be recovered using the key identification number and the master key. The derived key can then be used to recover the original data.

Components 40, 42, and 44 in the data conversion module 32 have Chipset Level-1 security. In other words, if the chipset 26 can be opened without breaking the chip and the bus 38 can be probed without breaking the chip, then the data stored on the component 40, 42, and 44 can be read. The NCDisk is designed so that even if such an attack is performed, no critical secrets will be revealed. First, even if an attacker can read the data stored on ROM software 40 and RAM software 42, the attacker will not be able to change the data on these two components for reasons described above. Further, even if an attacker can read the RAM data 44, which does contain some run-time data of the security processor 36, the runtime data will not reveal the critical secret of the NCDisk 20.

The critical secrets, which are the communication master keys 50 and NCDisk master keys 52, have Chipset Level-2 security. In other words, even if an attacker can open the chipset 26 without breaking the chip and probe the bus 38 without breaking the chip, the attacker will still not be able to obtain the value of component 50 and 52.

Figures 3A, 3B:
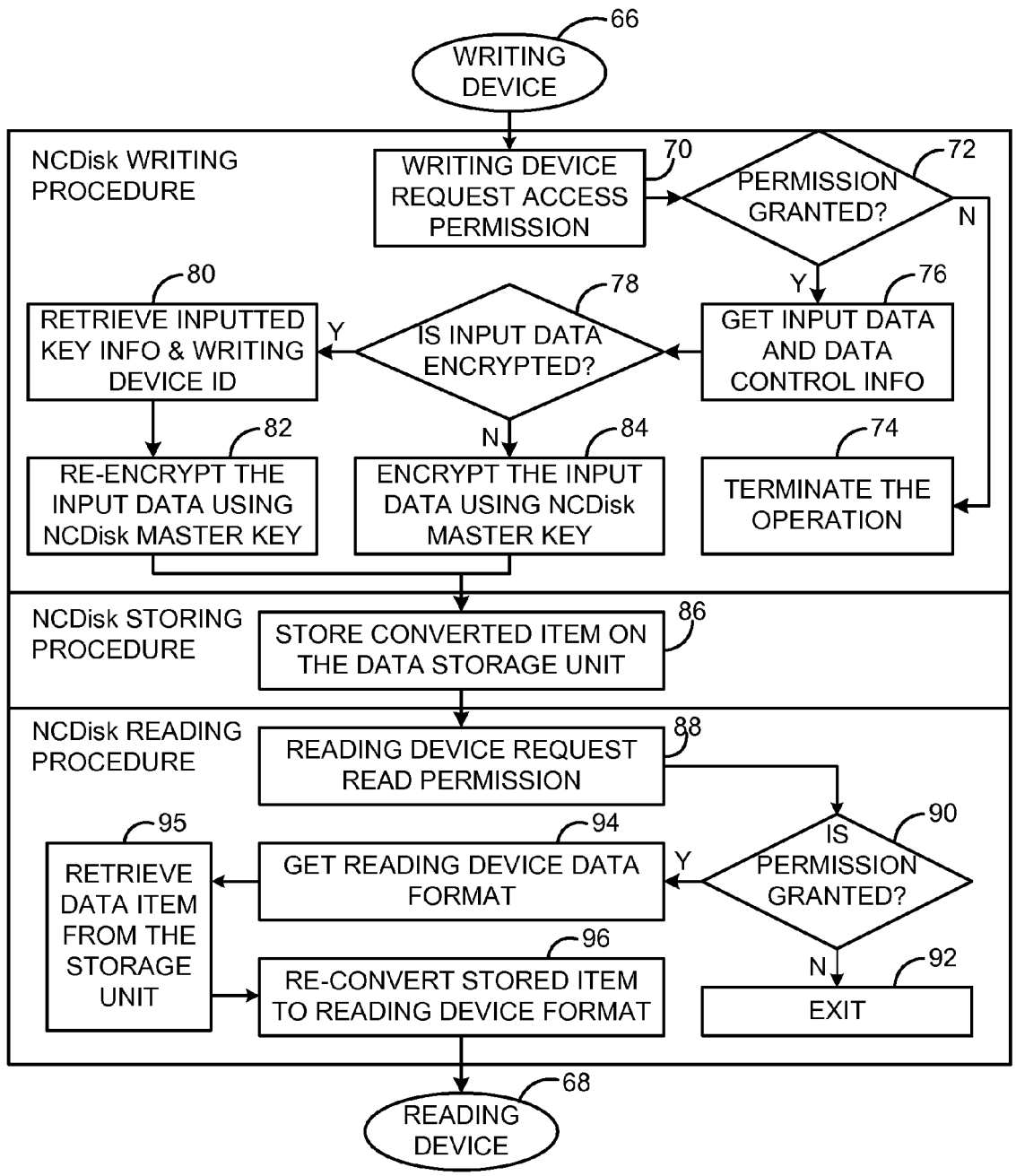
FIG. 3a shows a schematic connection of an NCDisk to a writing device and a reading device.
FIG. 3b shows a flowchart of a preferred operation of an exemplary NCDisk.

FIG. 3a shows the flowchart of a typical connection of the NCDisk 20 to a writing device 66 and a reading device 68. In FIG. 1, the writing device 66 was a PC 12, but it may actually be any device that can write data to the NCDisk 20. Likewise, the reading device 68 is any device that can read data from the NCDisk 20.

FIG. 3b shows a flowchart of operations that take place in using the NCDisk according to the connection of FIG. 3a. First, in block 70, the writing device 66 issues a request to the NCDisk for permission to write to the NCDisk. In block 72, the NCDisk uses an authentication protocol, described in more detail in FIG. 4, to determine the legitimacy of the writing device 68. If NCDisk 20 does not grant permission to write, the NCDisk 20 will terminate the communication with the writing device 66, as shown in block 74. If the NCDisk 20 does grant permission for the writing device 66 to write to it, the NCDisk 20 will obtain or receive the digital data and the other data control information from the writing device 66, as shown in block 76. Then, the NCDisk 20 determines from the data control information whether the data is in encrypted or unencrypted form, as shown in block 78.

If the data is in encrypted form, then the NCDisk 20 uses the data control information to retrieve the key material and ID of the writing device 66, as shown in block 80. Then, the NCDisk 20 uses the information obtained from block 80 and the NCDisk master key 52 to re-encrypt the inputted digital data, as shown in block 82. The re-encrypted digital data is then stored on the data storage unit 24 of the NCDisk 20, as shown in block 86. The re-encrypted digital data is only recoverable by the NCDisk 20. No other device, not even the writing device 66 will be able to recover the digital data stored on the NCDisk. Also, the re-encryption algorithm does not necessarily involve first decrypting the inputted digital data with the encryption key used by the writing device 66 and then encrypting the decrypted data with new keys derived from the NCDick master key 52. Instead, the re-encryption algorithm may be completed in one step that takes two keys as inputs and directly outputs the re-encrypted data.

If the data is in unencrypted form, then the NCDisk 20 uses a new key derived from the NCDisk master key 52 to encrypt the inputted data, as shown in block 84. This encrypted data is then stored on the data storage unit 24 of the NCDisk 20, as in block 86. This encrypted data is also only recoverable by the NCDisk 20.

When a reading device 68 requests to read a data from the NCDisk 20, as in block 88, it must first be authenticated by the NCDisk 20, as in block 90. This authentication is described in more detail in FIG. 4. If the NCDisk 20 does not authenticate the reading device 68, then the NCDisk terminates communication with the reading device 68, as shown in block 92. If the NCDisk does authenticate the reading device 68, then the NCDisk 20 obtains the data format used by the reading device 68, as shown in block 94. This data format is obtained either thoroughly secure communication at the time of authentication 90 or preinstalled in the NCDisk 20 during initial setup of the NCDisk 20. Then, the NCDisk converts the stored data to the data format of the reading device 68 and sends the data to the reading device 68, as shown in block 96.

Figure 4A:
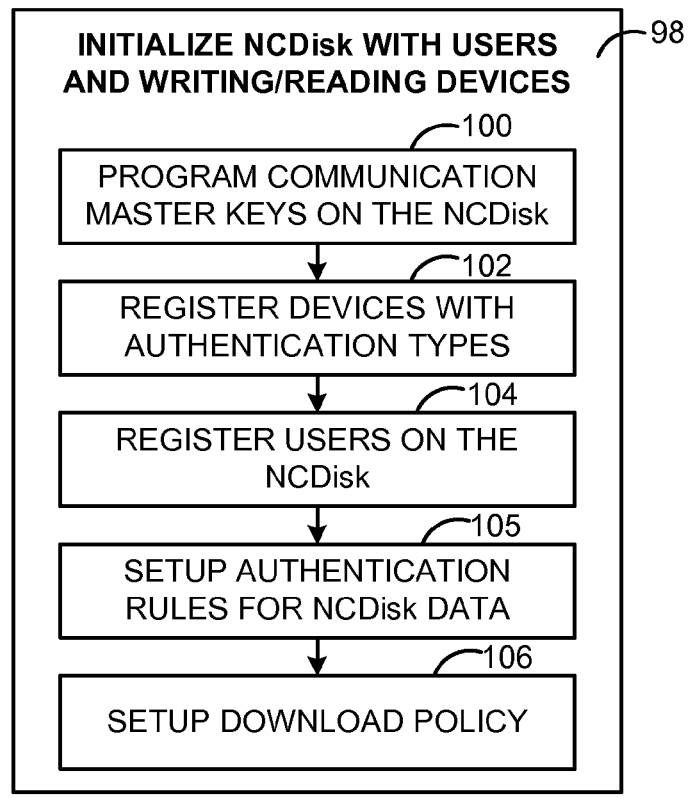
FIG. 4a shows a flowchart of an authentication method used for access-control to an NCDisk.
Figure 4B:
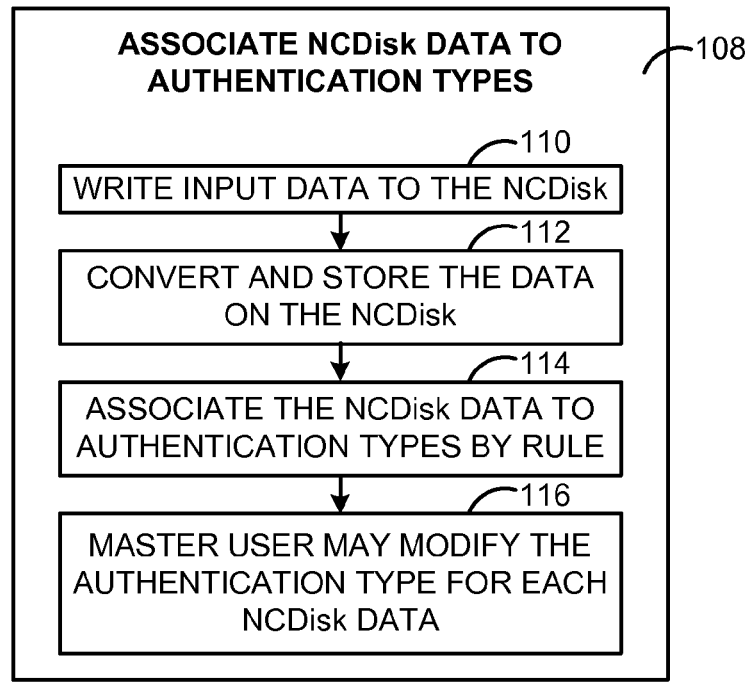
FIG. 4b shows a flowchart of a further authentication method used for access-control to an NCDisk.
Figure 4C:
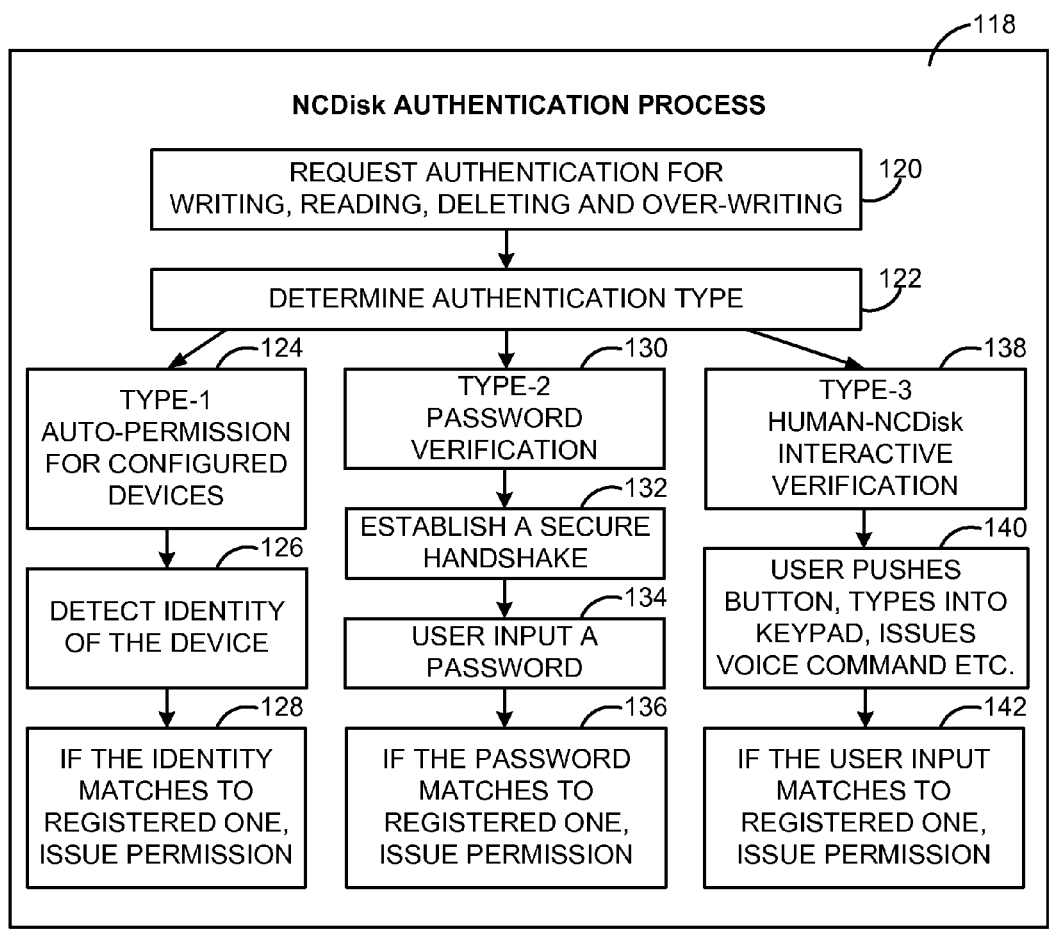
FIG. 4c shows a flowchart of yet a further authentication method used for access-control to an NCDisk.

FIG. 4a-4c are flowcharts of the authentication methods used for access-control to the NCDisk 20.

Prior to use, the NCDisk 20 needs to be initialized with writing devices, reading devices, and users, as shown in block 98 in FIG. 4a. Only the initialized devices and users may gain access to the NCDisk 20.

One step of the initializing process involves programming the communication master keys 50 into the NCDisk 20, as shown in block 100. These master keys 50 are also known by the corresponding writing devices 66 and reading devices 68 that need secure communication links with the NCDisk. The NCDisk securely protects the master keys 50 in a chipset level-2 security module. It is important that the writing devices 66 and reading devices 68 also securely protect these master keys 50 in chipset level 2 security modules.

Another step of the initializing process involves registering the writing devices 66 and reading devices 68 with the authentication type, as shown in block 102. Each time that a device wants to communicate with the NCDisk, it first needs to be authenticated by the NCDisk 20. Different devices may require different security levels, and may hence require different authentication. There are three major types of authentication, which will all be described later in block 118.

Another step of the initializing process involves registering the users with the NCDisk 20, as shown in block 104. An NCDisk 20 may allow multiple users to access it. Different users may have different security levels. For example, some users may only access the files they have written into the NCDisk 20, while other users may access any file on the NCDisk 20. Different authentication types are needed to differentiate the different types of users.

Another step of the initializing process involves programming the default rules for managing the authentication types for the data items stored on the NCDisk, as shown in block 105. Different data items may need different security levels and so may need different authentication types. The default set of rules automatically associates each input file to a default authentication type based on the name and the type of the data item. For example, the default rule could be to automatically set all .doc files to authentication type 1, while setting all bank_*.* to authentication type 2.

Another step of the initializing process involves setting up the downloading policy for the particular application, as shown in block 106. The downloading policy defines various parameters such as, but not limited to, what type of files the user may download, the speed of the download, the schedule and time management of the download process, etc. This downloading policy may be application specific. For example, for an interactive TV application, the user may configure a list of content that the device can automatically download. The user may configure a schedule to download each of the files on the list. In this way, the user may download and view the content based on the user's own schedule, instead of a fixed schedule from the TV station.

After initializing the NCDisk 20 with writing devices, reading devices, and users, in block 98, the NCDisk 20 also needs to associate each data item on the NCDisk to the appropriate authentication types, as shown in block 108 in FIG. 4b. First, a writing device writes an input data onto the NCDisk, as shown in block 110. The NCDisk 20 converts the input data using a new key that is derived by the NCDisk master key 52. The converted data item is stored on the data storage unit 24 of the NCDisk 20, as shown in block 112. Immediately after the inputted data is stored on the NCDisk 20, the NCDisk 20 associates the stored data item to an appropriate authentication type based on the default rules of authentication 106, as shown in block 114. These default rules provide a convenient and automatic way for users to manage the data security levels. However, if the user needs a special security level for the data item, block 116 shows that the master user can modify the authentication type for any data item stored on the NCDisk 20.

After associating the NCDisk authentication type for all writing devices, reading devices, users, and data items stored on the NCDisk, block 118 of FIG. 4c shows how the NCDisk performs authentication process for each access operation to the NCDisk. The authentication applies to writing, reading, deleting and overwriting operations of the NCDisk, as shown in block 120. First the NCDisk needs to determine what authentication type should be used for the current data, as shown in block 122. It should be one of the three types of authentication. The first type of authentication in block 124 is to automatically issue an access-permission for pre-configured devices, which are directly linked with the NCDisk 20 during the initial setup of block 102. In this type of authentication, the user is not involved with the authentication process. Hence, using the NCDisk is just as convenient as using a prior-art hard disk. To perform the type-1 authentication, block 126 detects the identity of the device. If the detected device identity is the same as the device identity registered on the NCDisk 20, the NCDisk 20 issues an access-permission for the device and the user, as shown in block 128. Block 130 shows the authentication type-2 that requires a user to input a password from the writing or reading device. First the NCDisk 20 establishes a secure handshake between the NCDisk and the device, as shown in block 132. Then the user inputs a password from the device, as shown in block 134. If the NCDisk 20 verifies that the inputted password matches to the NCDisk registered password for the user, then the authentication is established, as shown in block 136. Another type of authentication is authentication type-3, as shown in block 138. It is designed for human-NCDisk interactive verification to prevent any software attacks on the NCDisk. It requires a human to physically interact with the NCDisk in order to get access permission. For example, users may need to push a button or input values on a keypad on the NCDisk 20, issue a voice command to the NCDisk 20, input some biometric measurements through the NCDisk 20, etc, as shown in block 140. If the user's input matches to the NCDisk registered value, the NCDisk grants the access permission, as shown in block 142.

Figure 5:
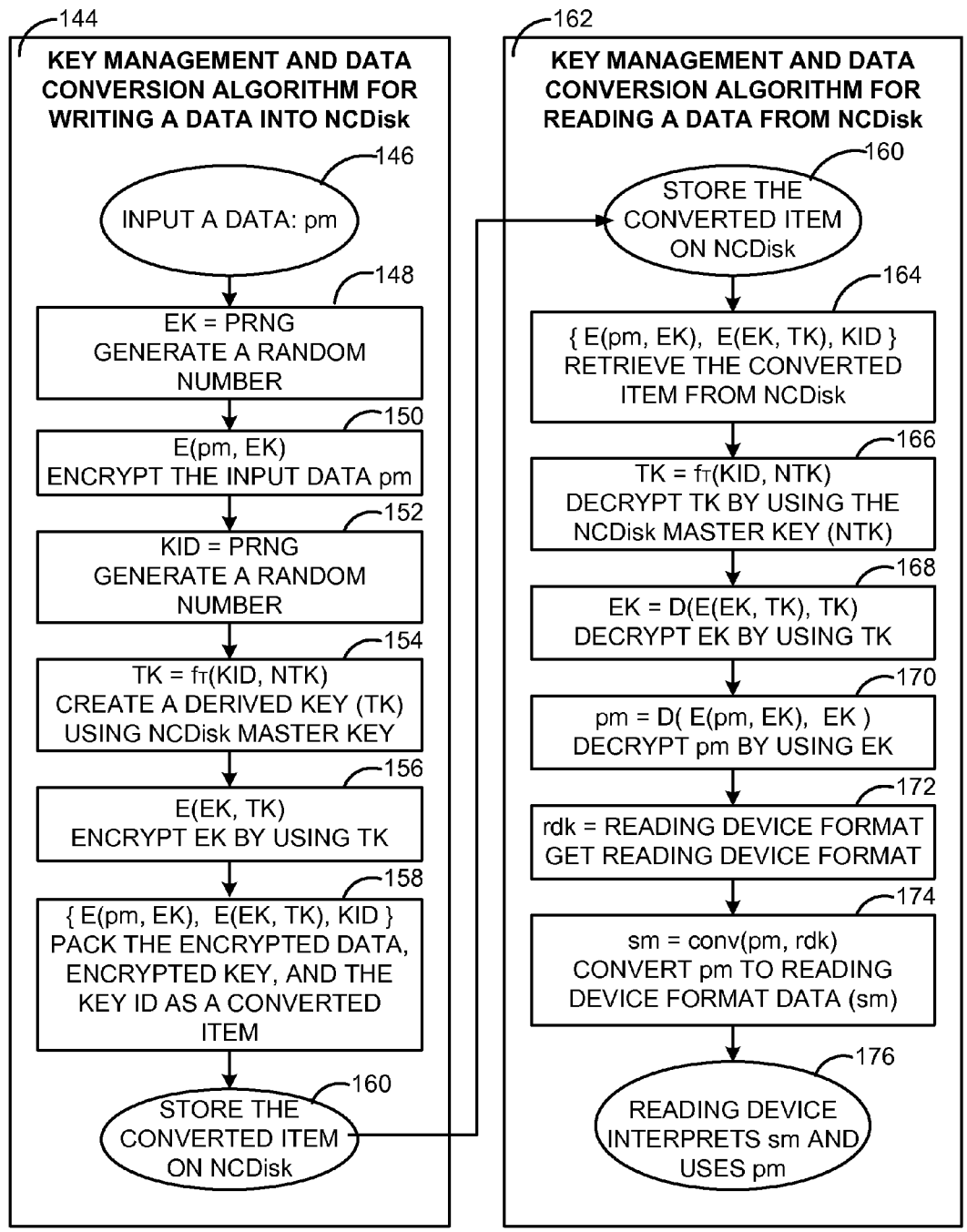
FIG. 5 shows a flowchart for a data conversion and key management procedure used in writing digital data to, and reading digital data from, a NCDisk.

FIG. 5 first shows a flowchart for the data conversion and key management procedures involved in writing a digital data to the NCDisk 20, as shown in block 144. First, a writing device 66 inputs a digital data into the NCDisk 20, as shown in block 146. Then, the NCDisk 20 generates an encryption key EK using the pseudo-random number generator (PRNG 58), as in block 148. The encryption key is used to encrypt the data, as shown in block 150. Then, the NCDisk 20 generates a key ID (KID) number used to identify the piece of digital data, as shown in block 152. The KID and the NCDisk master key NTK 52 are inputted into the key derivation function 60 to produce the derived key TK, as shown in block 154. The derived key TK is then used to encrypt the encryption key EK, as shown in block 156. Then, in block 158, the following three pieces of data are packed together and we call it a data item:
1. E(pm, EK): encrypted digital data pm that is encrypted by encryption key EK
2. E(EK, TK): encrypted encryption key EK that is encrypted by derived key TK
3. KID: identification number which is associated with encryption key EK This data item is then stored on the data storage unit 24 of the NCDisk, as shown in block 160.

FIG. 5 further shows a flowchart for the data conversion and key management procedures involved in reading a data item from the NCDisk 20, as shown in block 162. To read a piece of digital data, the NCDisk 20 first gathers the data item corresponding to the digital data, as in block 164. The KID of the data item, along with the NCDisk master key NTK is inputted into the key derivation function 60 to re-derive the derivation key TK used for this piece of digital data, as in block 166. Then, the derivation key TK is used to decrypt the encrypted encryption key EK, as shown in block 168. The encryption key EK is used to decrypt the encrypted digital data, as shown in block 170. Then, the NCDisk 20 obtains a format key from the reading device, as shown in block 172. This format key may be shared by the NCDisk 20 and the reading device 68. In that case, the format key is part of the communication master keys 50. Then, the NCDisk 20 uses this format key to convert the digital data to a form that is recognizable by the reading device 68, as shown in block 174. This converted data is sent to, interpreted by, and used by the reading device 68, as shown in block 176.

When the data conversion and key management procedure shown schematically in FIG. 5 an described above is used with the NCDisk architecture shown schematically in FIG. 2, the privacy of the encrypted digital data is securely protected. Only the NCDisk, which has access to the NCDisk master keys, can decrypt the data stored on the NCDisk.

Figure 6:
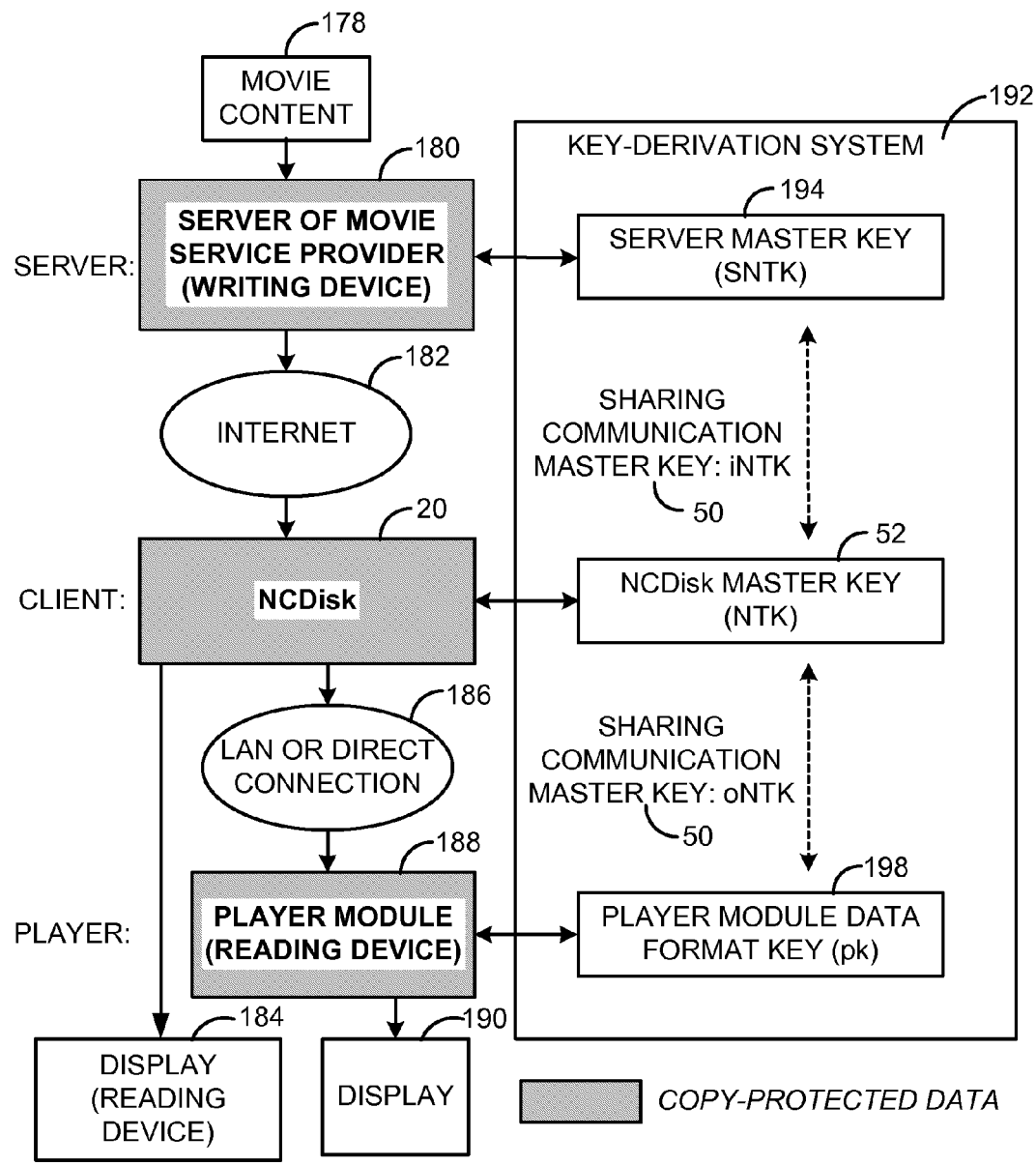
FIG. 6 shows a block diagram of an exemplary online movie download system that incorporates a NCDisk to protect the movie content against illegal copying.

FIGS. 1-5 describe the hardware architecture, operational procedure, authentication process, data conversion algorithm, and key management algorithm for the non-copy-able data storage system. FIGS. 6-8 describe various application systems that incorporates the non-copy-able data storage system to protect the data content stored on the application systems.

FIG. 6 shows the block diagram of an online movie download system that incorporates the NCDisk 20 to protect the movie content against illegal copying. This system starts off with a movie content 178 that is provided by a movie distributor. The movie content 178 is securely sent to the movie service provider. The movie service provider obtains the movie content 178, encrypts the movie, and stores the encrypted movie on the server 180. The movie service provider can store a large database of movies that are securely stored on its server 180 in encrypted form.

Then, when people join the movie download service, the server 180 will establish a client account and physically send a programmed NCDisk 20 to the client. The client may use the NCDisk 20 to download movies from the server 180 either by connecting the NCDisk 20 to a PC and downloading the movie from the internet 182 to the PC, or by connecting the NCDisk 20 directly to the internet 182 through a router using a built-in Ethernet port that may be part of the input/output port on the NCDisk 20. In this system, the movie service provider server 180 is the writing device 66 for the NCDisk 20.

After downloading the movie onto the NCDisk 20, the client can play the movie on a display. There are two ways to connect the NCDisk 20 to the display. Firstly, the client can directly connect the NCDisk 20 to a reading device display 184. In this case, the reading device display 184 is incorporated into, and considered to be part of, the reading device 68. The NCDisk 20 converts the stored movie into a format that is recognizable by display 184. Secondly, the client may connect the NCDisk 20 to a player module 188 through either a network LAN or direct connection 186. In this case, the player module 188 is considered to be the reading device 68. The NCDisk 20 converts the stored movie into a format that is recognizable by the player module 188. This format is preferably a securely encrypted format since it may need to pass through a public network 186. The player module 188 further connects to a display 190 by converting the encrypted content to a form that is recognizable by the display 190.

If implemented correctly, there is no easy way for anyone to copy the content at any stage in the movie download system. If the display 184 or 190 is a TV or PC monitor, then the format of the content sent to the TV or PC monitor is a copy-protected analog signal such as the one published in the CSS specification.

This secure copy-protection may be achieved by the key-derivation system 192 that is distributed on the server 180, client NCDisk 20, and player module 188. The server 180 encrypts all movie contents stored on its database using keys derived by the server master key 194. Each movie is encrypted using a different derived key. Then, during the initial setup for a client, the server generates a new set of communication master keys 50, including the sharing communication master key, iNTK, that is shared between the server 180 and the NCDisk 20, and the sharing communication key, oNTK, that is shared between the NCDisk 20 and the player module 188. The iNTK and oNTK are programmed into the NCDisk 20 during the initial setup for a client, and the oNTK is further programmed into the player module prior to being sent to the client. In addition, the NCDisk master key NTK 52 is known only by the NCDisk 20. Finally, the player module data format key pk 198 is used by the player module to convert the content received from the NCDisk 20 to a form that is recognizable by the display 190.

Figure 7A:
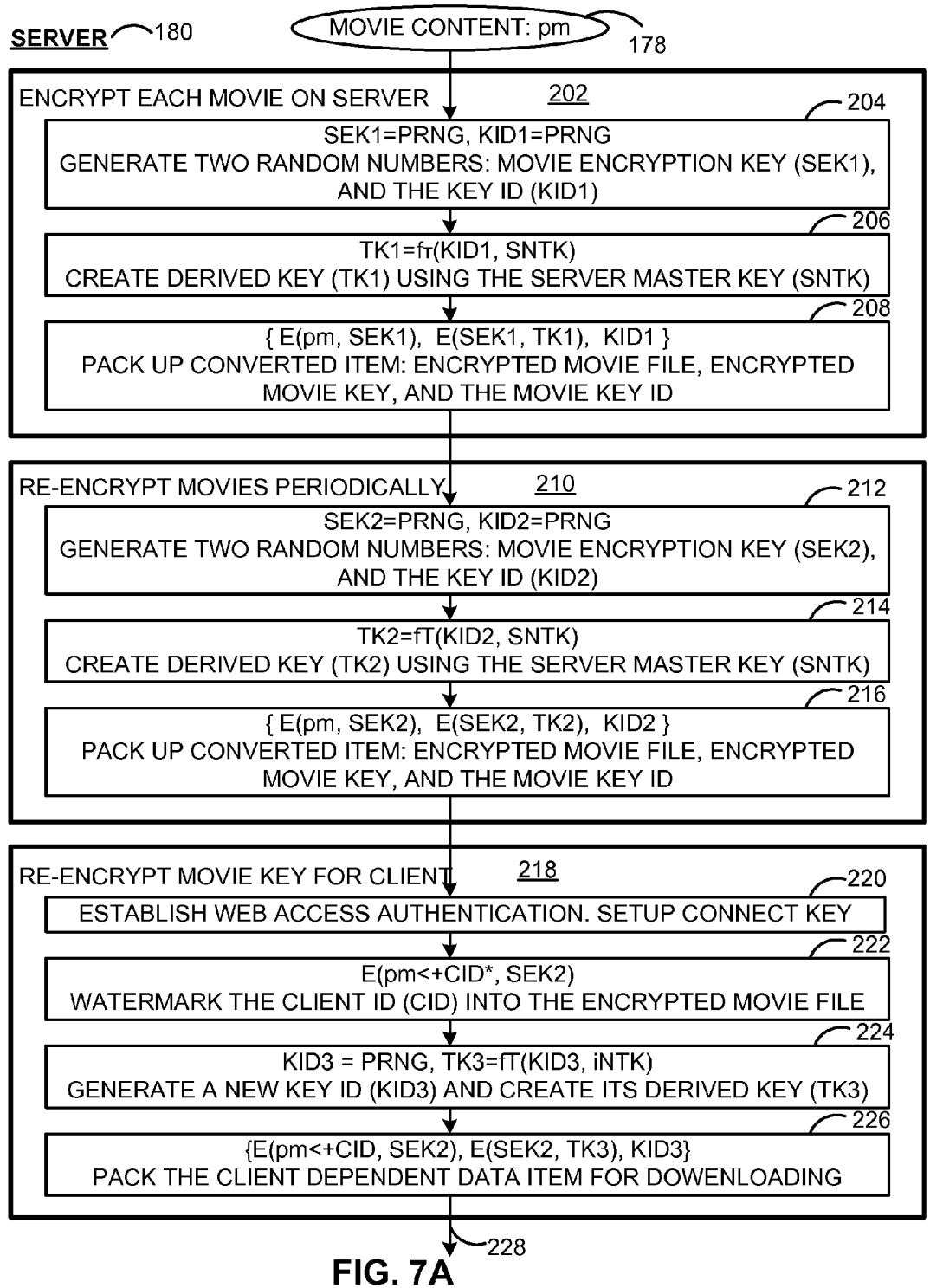
FIG. 7 provides the detailed security protocol for the movie download system described in FIG. 6.
Figure 7B:
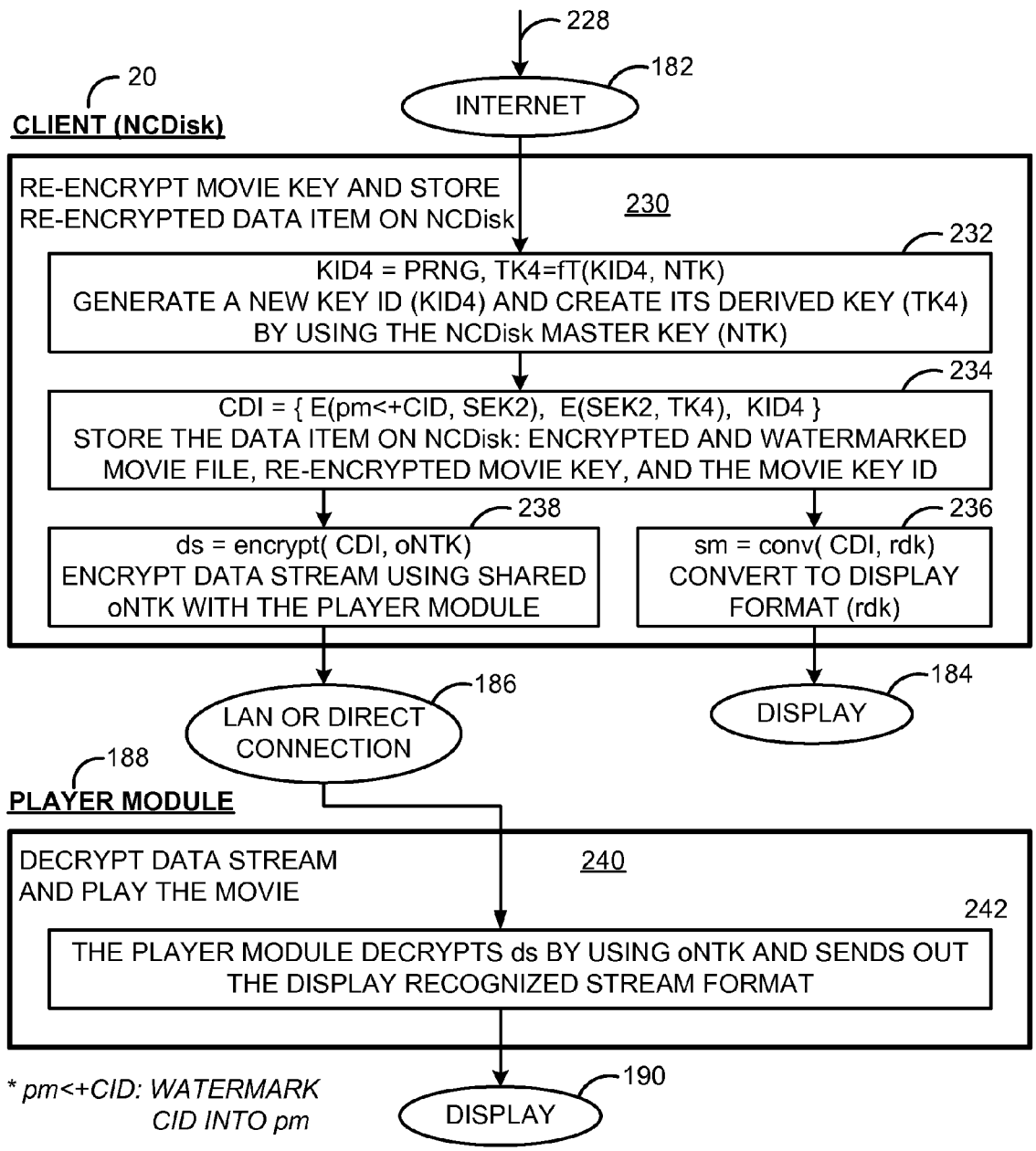
Figure 8:
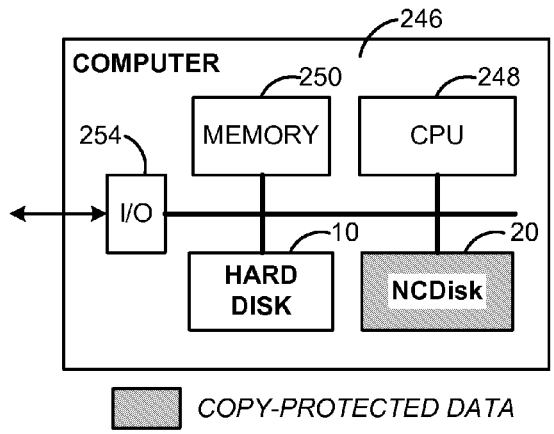
FIG. 8 shows a block diagram of a computer system that incorporate the NCDisk to protect data content stored on the computer system.

FIG. 7A-7B provides the detailed security protocol for the movie download system described in FIG. 6. There are many ways to implement the security protocol based on the NCDisk architecture and the system described in FIG. 6. FIG. 7A-7B discloses a preferred way.

FIG. 7A provides the security protocol involved on the server side. At the server 180, each movie content 178 is encrypted and stored on the server, as detailed in block 202. First, in block 204, the server 180 generates two random numbers: the movie encryption key SEK1, which is used to encrypt the movie content 178, and the key identification number KID1, which is associated with the encryption key SEK1. Then, in block 206, the server master key SNTK 194 and the KID1 is inputted into the key derivation function 60 to generate the derived key TK1. Then, block 208 packs up the converted data item, which includes
1. E(pm, SEK1): movie content pm 178 that is encrypted by encryption key SEK1
2. E(SEK1, TK1): encrypted encryption key SEK1 that is encrypted by derived key TK1
3. KID1: identification number which is associated with encryption key SEK1

The converted data item is stored on the server.

Further, the server may wish to periodically re-encrypt the movies on its database as part of standard key management procedures. This step is detailed in block 210. First, in block 212, the server 180 generates two random numbers: the movie re-encryption key SEK2, which is used to re-encrypt the movie content 178, and the key identification number KID2, which is associated with the encryption key SEK2. Then, in block 214, the server master key SNTK 194 and the KID2 is inputted into the key derivation function 60 to generate the new derived key TK2. Then, block 216 packs up the re-converted data item, which includes:

1. E(pm, SEK2): movie content pm 178 that is re-encrypted by encryption key SEK2
2. E(SEK2, TK2): encrypted encryption key SEK2 that is encrypted by derived key TK2
3. KID2: identification number which is associated with encryption key SEK2

The re-converted data item is stored on the server.

When the client wishes to download a movie from the server 180 to the NCDisk 20, the server re-encrypts the stored data item to associate the data item to the particular NCDisk 20. First, in block 220, the server establishes a secure authentication with the client by using standard authentication protocols such as SSL. This authentication is used only to establish a communication link that allows the client to access their web account on the server 180. This authentication is not the same as the NCDisk authentication described in FIG. 4. This authentication allows a client to access the server database, while the NCDisk authentication allows the server to download movies onto the particular NCDisk 20. Note that this movie download system uses type-1 authentication 124, in which case the user is not involved in the NCDisk authentication process. In other words, the user only needs to choose a particular movie from the server 180, and the server communicates directly with the NCDisk 20 by using a pre-installed shared communication master key iNTK 50, which ensures that only the legitimate NCDisk 20 can obtain and understand the downloaded material.

Second, in block 222, the server watermarks the movie content 178 with the client ID CID. This is to ensure that all the movies that are sent from the server can eventually be traced back to the client. This way, in case any movies are pirated and spread over the internet, the pirated content may be traced back to the original client. Then, the server may revoke the rights of the client or issue a command to disable the NCDisk.

Next, in block 224, the server generates a new key id KID3 and derives a key TK3 by using the KID3 and the communication master key iNTK 50 using the key derivation function 60. Note that this communication master key iNTK 50 is shared between the server 180 and the NCDisk 20. The TK3 is used to re-encrypt the encryption key SEK2 for the movie.

Then, in block 226, the server packs the data item, which includes

1. E(pm<+CID, SEK2): movie content pm 178 that is watermarked by CID and encrypted by encryption key SEK2.
2. E(SEK2, TK3): re-encrypted encryption key SEK2 that is re-encrypted by derived key TK3
3. KID3: identification number which is associated with encryption key SEK2

This packed data item is then sent to the authenticated NCDisk 20 through the internet 182.

FIG. 7B shows the security protocol for the client NCDisk 20 and player module 188. The NCDisk 20 receives the packed data item 226 and converts and stores it, as detailed in 230. First, in 232, the NCDisk 20 generates a new key ID KID4 and derives a new key TK4 with the KID4 and the NCDisk master key NTK 52 using the key derivation function 60. The TK4 is used to re-encrypt the encryption key SEK2. Then, in block 234, the NCDisk packs the converted data item, which includes:

4. E(pm<+CID, SEK2): movie content pm 178 that is watermarked by CID and encrypted by encryption key SEK2.
5. E(SEK2, TK4): re-encrypted encryption key SEK2 that is re-encrypted by derived key TK4
6. KID4: identification number which is associated with encryption key SEK2

This packed data item is then stored on the NCDisk 20. Note that the key TK4 can only be re-derived by the NCDisk 20.

When the client wishes to play the movie content on the NCDisk 20, the client connects the NCDisk 20 to a reading device 68. This reading device 68 may be either a player module 188 or a display 184. If the reading device 68 is a display 184, then the NCDisk 20 directly converts the stored data item CDI 234 to a display form rdk that is recognizable by the display 184, as shown in block 236. If the reading device 68 is a player module 188, then the NCDisk 20 re-encrypts the stored data item CDI 234 using a communication master key oNTK that is shared between the NCDisk 20 and player module 188, as shown in block 238. The re-encrypted data item may be in a streaming format rather than the original digital format. This re-encrypted data item is sent to the player module 188 through LAN or direction connection 186. The player module further decrypts the received data item 238 using the shared communication master key oNTK 50, converts the data item to a format recognizable by the display 190, and sends the output to a display 190.

Figure 9:
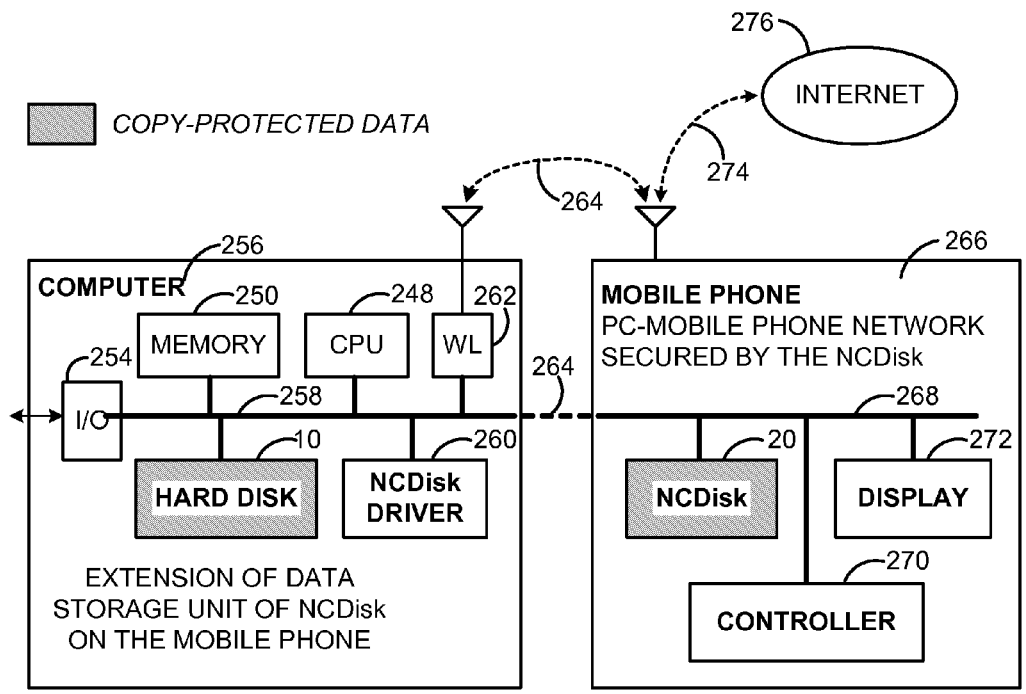
FIG. 9 shows a block diagram of a secure PC-mobile phone network system that incorporates the NCDisk.
Figure 10:
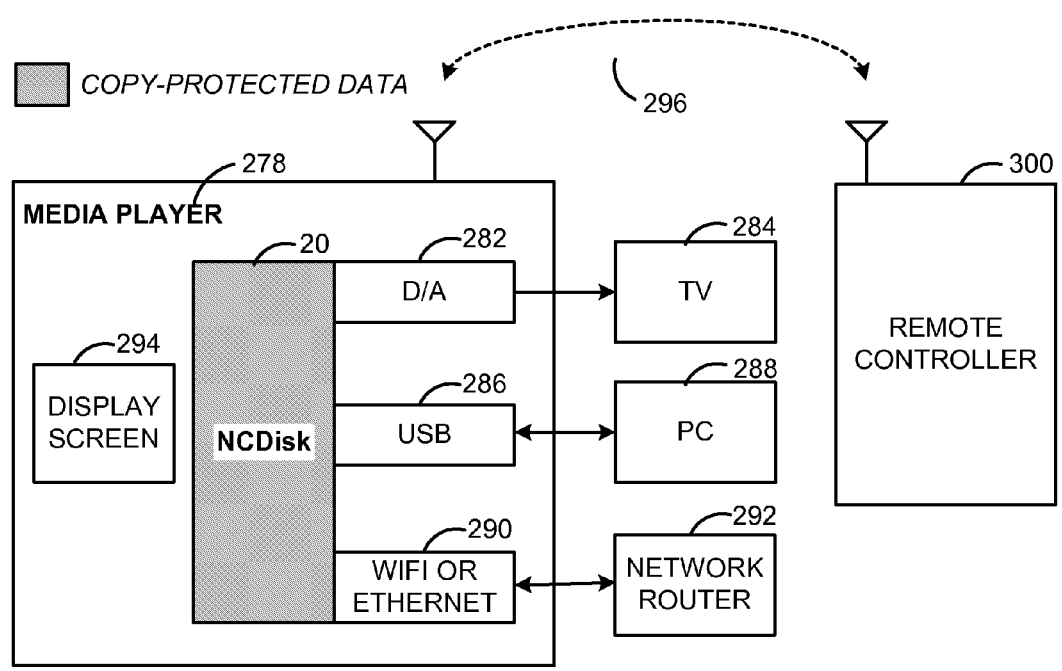
FIG. 10 shows a block diagram of a media player system that incorporates the NCDisk to protect the data content stored on the media player.

FIG. 8-10 shows other example application systems that incorporate the NCDisk 20 to protect data content stored on the application system.

As described previously, the security of the data stored on prior art hard disks is controlled by the computer operating system and software. Hence, any security weaknesses and bugs of the computer operating system and software may become a security weakness of the data stored on the prior art hard disk. The present invention overcomes this problem, as shown in FIG. 8, which shows a block diagram of a computer system 246 that incorporates the NCDisk 20. The computer system 246 consists of prior art input/output 254, memory 250, and CPU 248. The computer system 246 also consists of both a prior art hard disk 10 and a NCDisk 20. The prior art hard disk 10 is used to store software and data that does not require secure protection. The NCDisk 20 is used to store files that require data protection. When a computer user writes data into the NCDisk 20, the NCDisk 20 internally converts the input data to a form that is only recognizable by the NCDisk 20. Hence, the data stored on the NCDisk 20 may not be copied to any other device. When the user requests to read the data item stored on the NCDisk, the NCDisk first request the user to authenticate his/her identity using one of the three types of authentication methods described in FIG. 4. After the user is authenticated, the NCDisk converts the stored data into a form that is recognizable by the software that the user uses to open the data file.

FIG. 9 shows a block diagram of a secure PC-mobile phone network system that consists of a mobile phone 272, a computer 256, and a wireless communication system 268 between the mobile phone and the computer. In this secure PC-mobile phone network system, the NCDisk 20 is incorporated inside the mobile phone 272. The NCDisk 20 protects both the data stored inside the mobile phone 272 and on the hard disk 10 of the computer 256. When the computer 256 writes a data file into the hard disk 10, the NCDisk 20 will read that file through the wireless link 268, convert the file, and save it back into the hard disk 10. Hence, the data on the computer hard disk is copy protected by the mobile phone 272. Only the user that carries the mobile phone 272 can access the encrypted content stored on the hard disk 10. Such a system prevents other people to access the encrypted content stored on the hard disk 10. When traveling, if the PC is not connected to the internet, then the PC still can connect to the internet through the mobile phone if the phone has signal. In that case, the mobile phone can acts as a wireless router for the PC. Further, if the user is inside a building and cannot receive a cell phone signal but the PC can be connected to the Internet, then the mobile phone can still be used to make and receive calls through the computer over the internet. In both cases, the NCDisk 20 can securely protect the data content transmitted or received from the internet.

FIG. 10 shows a block diagram of a media player system that incorporates the NCDisk 20 to protect the data content stored on the media player 278. The media player consists of a display screen 294, an NCDisk 20, a digital-to-analog (D/A) converter 282 that can connect to a display screen such as a TV 284, an USB port 286 that can connect to a PC 288, and a WiFi or Ethernet port 290 that can connect to a network router 292. The media player 278 behaves like a diskless DVD player in that it can play movies on a TV or on its own display screen without the need of a disk. The quality of the movies stored on the media player 278 can be DVD quality or higher. The media player 278 works as follows. First, the user of media player can buy digital movie contents from a store by traveling to the store, connecting the media player to the store computer that is connected to the store movie database, and downloading a movie file from the store computer into the user's media player 278. Alternatively, the user can buy digital movie contents by connecting the media player 278 to the internet and downloading the movie contents directly onto the media player 278. When storing a digital movie file onto the NCDisk 20 in the media player 278, the movie file is internally converted by the NCDisk with the NCDisk master key 52. Hence, no other device knows the NCDisk master key 52. Therefore, the movie files cannot be copied to any other devices. This non-copyable feature overcomes the security problems of the prior-art DVD disk in the prior-art DVD system. Further, the media player 278 can either play the movie on internal display screen 294 or on a TV 284 through D/A port 282. The media player 278 may also play the movie on a PC 288 through an USB port 286. Whichever display is used for playing the movie, the user can use a remote control 300 to control the playing operation through a wireless link 296. The end result is that the user can watch the movie on the media player as if the user was watching the movie on a prior-art DVD system using a remote control.

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention. Modifications may readily be devised by those ordinarily skilled in the art without departing from the spirit or scope of the present invention.

What is claimed is:

1. A method of storing data, said method comprising the steps of:

receiving data in a first data format via a data store input/output port into a computer-readable memory using a control unit without user inputting data converting secrets;
converting said data from said first data format to a second data format using a data converting unit associated with a data storage unit comprising the acts of:
generating an encryption key using a first pseudo-random number;
encrypting said data using said encryption key;
generating a key identifier using a second pseudo-random number;
generating a derived key using a master key and said key identifier;
encrypting said encryption key using said derived key; and
writing the data in the second data format to the data storage unit using the data converting unit; wherein writing said data further comprises writing said encrypted data, said encrypted encryption key and said key identifier to said data storage unit without storing said encryption key and said derived key after said data converting.

2. The method of claim 1 further comprising reading the data from the data storage unit using the data converting unit.

3. The method of claim 2 further comprising a second step of converting said data to a third data format.

4. The method of claim 3 wherein said first data format and said third data format are substantially equivalent.

5. The method of claim 1 wherein writing said data to a storage unit further comprises using a level 2 security encryption system.

6. The method of claim 2, wherein reading said data from said data storage unit further comprises using a level 2 security decryption system.

7. The method of claim 1, further comprising reading said data from said data storage unit wherein reading further comprises using a level 2 security decryption system that comprises the steps of reading said encrypted data, said encrypted encryption key and said key identifier from said data storage unit; recovering said encryption key using said key identifier and said master key; decrypting said data using said encryption key.

8. The method of claim 7 wherein said master key is non-readable by said control unit or the network that is connected to the data storage device, generating an encryption key further comprises using a data register to transfer said encryption key from a key management module to a data conversion module.

9. A system of storing data, comprising:
means for receiving data in a first data format via a data store input/output port into a computer-readable memory using a control unit without user inputting data converting secrets;
means for converting said data from said first data format to a second data format using a data converting unit associated with a data storage unit comprising the acts of:
generating an encryption key using a first pseudo-random number;
encrypting said data using said encryption key;
generating a key identifier using a second pseudo-random number;
generating a derived key using a master key and said key identifier;
encrypting said encryption key using said derived key; and
means for writing the data in the second data format to the data storage unit using the data converting unit; wherein said means for writing said data further comprises writing said encrypted data, said encrypted encryption key and said key identifier to said data storage unit without storing said encryption key and said derived keg after said data converting.

10. The system of claim 9 further comprising means for reading the data from the data storage unit using the data converting unit.

11. The system of claim 10, wherein said means for writing said data to a storage unit further comprises a level 2 security encryption system; and wherein said means for reading said data from said data storage unit further comprises a level 2 security decryption system.

12. The system of claim 11 wherein said level 2 security decryption system further comprises means for reading said encrypted data, said encrypted encryption key and said key identifier from said data storage unit; means for recovering said encryption key using said key identifier and said master key; means for decrypting said data using said encryption key.

13. The system of claim 12 wherein said master key is non-readable by said control unit or the network that is connected to the data storage device, means for generating an encryption key further comprises means for using a data register to transfer said encryption key from a key management module to a data conversion module.

14. A device for storing data, comprising:
data in a first data format received via a data store input/output port into a computer-readable memory using a control unit without user inputting data converting secrets;
a data converting unit associated with a data storage unit, said data converting unit capable of converting said data from said first data format to a second data format comprising the acts of:
an encryption key generating using a first pseudo-random number;
an encryption unit capable of encrypting said data using said encryption key;
a key identifier generating using a second pseudo-random number;
a derived key generated using said master key and said key identifier;
an encryption unit capable of encrypting said encryption key using said derived key; and
writing the data in the second data format to the data storage unit; wherein said data writing unit is further capable of writing said encrypted data, said encrypted encryption key and said key identifier to said data storage unit without storing said encryption key and said derived key after said data converting.

15. The device of claim 14 further comprising a data writing unit, said data writing unit further comprising a level 2 security encryption system; and data reading module, said data reading module further comprising a level 2 security decryption system.

16. The device of claim 15 wherein said level 2 security decryption system further comprises a decryption unit capable of reading said encrypted data, said encrypted encryption key and said key identifier from said data storage unit, and wherein said decryption unit is further capable of recovering said encryption key using said key identifier and said master key, and of decrypting said data using said encryption key.

17. The device of claim 16 wherein said master key is non-readable by said control unit or the network that is connected to the data storage device.

18. The method of claim 1 wherein the first and second pseudo-random numbers are the same.

19. The system of claim 9 wherein the first and second pseudo-random numbers are the same.

20. The device of claim 16 wherein the first and second pseudo-random numbers are the same.

* * * * *